United States Patent [19]

Bowhill et al.

[11] Patent Number: 5,040,109
[45] Date of Patent: Aug. 13, 1991

[54] EFFICIENT PROTOCOL FOR COMMUNICATING BETWEEN ASYCHRONOUS DEVICES

[75] Inventors: William J. Bowhill, Marlborough; Robert Dickson, Arlington; W. H. Durdan, Waban, all of Mass.

[73] Assignee: Digital Equipment Corporation, Maynard, Mass.

[21] Appl. No.: 221,920

[22] Filed: Jul. 20, 1988

[51] Int. Cl.⁵ .................... G06F 13/14; G06F 13/36; G06F 13/42
[52] U.S. Cl. .................................... 364/200; 364/900
[58] Field of Search .............................. 364/200, 900

[56] References Cited

U.S. PATENT DOCUMENTS

| | | | |
|---|---|---|---|
| 4,541,046 | 9/1985 | Nagashima et al. | 364/200 |
| 4,648,034 | 3/1987 | Heminger | 364/200 |
| 4,729,094 | 3/1988 | Zolnowsky et al. | 364/200 |
| 4,803,629 | 2/1989 | Inagami et al. | 364/200 |
| 4,860,201 | 8/1989 | Stolfo et al. | 364/200 |
| 4,894,768 | 1/1990 | Iwasaki et al. | 364/200 |
| 4,942,519 | 7/1990 | Nakayama et al. | 364/200 |
| 4,953,082 | 8/1990 | Normura et al. | 364/200 |

OTHER PUBLICATIONS

Microprocessor and Programmed Logic; Short, Kenneth L., 1981 by Prentice Hall, Inc., Englewood, N.J., pp. 264-269.
"80387sx 80-Bit Numeric Processor Extension", Data Sheet Published by Intel Corporation, May 1988, pp. 1 and 16-26.
James P. Gray, "Line Control Procedures", Proceedings of the IEEE, vol. 60, pp. 1301-1312, Nov. 1972.
Mishra, "The VAX 8800 Microarchitecture", Digital Technical Journal, Feb. 1987, pp. 20-33.

Primary Examiner—Michael R. Fleming
Assistant Examiner—Christopher B. Shin
Attorney, Agent, or Firm—Arnold, White & Durkee

[57] ABSTRACT

A method for synchronizing data transfers in a data processing system is presented. The invention includes two separate clocks generated by a slave processor, one of which is used to synchronize outgoing signals from the communicating elements and the second of which is used to synchronize incoming signals to the communicating elements.

12 Claims, 8 Drawing Sheets

CASE WHERE VECTOR PROCESSOR IS RUNNING MUCH SLOWER THAN THE SCALAR PROCESSOR

CASE WHERE VECTOR PROCESSOR IS RUNNING AT APPROXIMATELY THE SAME SPEED AS THE SCALAR PROCESSOR

CASE WHERE VECTOR PROCESSOR IS RUNNING MUCH SLOWER THAN THE SCALAR PROCESSOR

CASE WHERE VECTOR PROCESSOR IS RUNNING AT APPROXIMATELY THE SAME SPEED AS THE SCALAR PROCESSOR

… …

EFFICIENT PROTOCOL FOR COMMUNICATING BETWEEN ASYCHRONOUS DEVICES

RELATED APPLICATIONS

This invention is related to the following application, which is assigned to the assignee of the present invention and concurrently filed herewith in the names of the inventors listed:

A Method and Apparatus For Optimizing Interprocessor Instruction Transfers, Robert Dickson, W. Hugh Durdan and George Michael Uhler, Serial Number 221,987.

FIELD OF THE INVENTION

This invention relates generally to communication between elements of a data processing system. More particularly, this invention relates to a convention governing data exchange between asynchronous elements of a multiple-processor computer system.

BACKGROUND OF THE INVENTION

The various parts of a computer, such as processors, memory elements and I/O devices, communicate with each other through busses which may comprise many signal lines. One group of signal lines in a bus, called the handshake lines, controls the timing of data transfers between the various asynchronous parts of the computer system. The handshake lines carry the signals that dictate when each data transfer begins and ends. The handshakes start and stop transactions and exert the same functional control on all transactions regardless of type.

Known protocols fall generally into three broad classes: synchronous (clocked transfer, one clock period per transfer); asynchronous (unclocked); and semisynchronous (clocked transfer, one or more clock periods per transfer).

The principal advantage of data communications in a synchronous system is simplicity. Data transfers are controlled through a single signal and the data transfers run with minimal overhead in terms of skew, setup, hold and propagation delays. However, data communication in a synchronous system has a serious problem dealing with slow devices connected to the bus. The fully synchronous bus cannot accommodate devices whose access time is greater than the time available during a bus clock period. With a fully synchronous protocol, the bus clock rate must be set slow enough to satisfy the slowest device on the bus where the device's response time includes the effect of propagation delays due to physical separation. But this reduces the maximum data rate for all transactions, and the slow device has thereby decreased the potential system performance even though the slow device may be rarely accessed.

For the computer system that comprises a mix of devices with widely varying access times, the synchronous communications protocol may be inappropriate because the bus runs at the speed of the slowest device. It is advantageous for the system to allow for fast transactions for fast devices and slow transactions for slow or distant devices, so that transaction time varies with the device rather than being fixed by a system clock. To achieve this advantage, in some systems, data transferral is performed by utilizing asynchronous devices and a fully handshaked protocol wherein the communicating elements must positively acknowledge each step of every transaction. However, this protocol is inefficient due to the multitude of signal transitions which must be monitored to complete a data transfer. Further, the delays involved in waiting for the acknowledgement of each step also slow the process.

Other known systems employ a wait signal or clock cycle stall mechanism generated by the responding element of an asynchronous system to delay the transfer for an indeterminate number of clock cycles until the responding element is ready to receive data. Since the wait signal must be asserted within a fixed period of time, the length of the bus is physically limited. Also, the clock stall mechanism involves a complex circuit.

Still other known systems employ a split-cycle protocol in which the responding unit of a read memory transaction becomes the transmitting unit of a write transaction when it has obtained the necessary data. This allows the bus to be used for other transactions during the intervening idle cycles. In this system, however, both communicating elements must have the logic necessary to assume both master and slave roles in a transaction. Further, the communicating elements must have the logic necessary for bus arbitration in order to prevent conflicts when accessing the bus to transmit data.

It would be advantageous to employ a data transfer protocol that improves the performance of communications between asynchronous system elements, and reduces the complexities of the bus interface signals.

SUMMARY OF THE INVENTION

The above and other objects of the invention are achieved by the present invention by allowing one of the communicating elements (referred to herein as the second element) to operate synchronously with the bus while providing a simplified asynchronous interface for the other communicating element (referred to herein as the first element). The present invention employs a drive clock and a latch clock, both of which are generated by the second element constantly. Both communicating elements send and receive all of the bus signals based on the timings to the two clocks, even though the communicating devices operate asynchronously.

The second element, which drives the clocks, puts the clocks on the bus. The first element, which operates asynchronously to the second element and the bus, must synchronize outgoing data to the drive clock and synchronize incoming data to its internal clocks. This approach has the advantage that only one of the elements needs to deal with the complexities of an asynchronous interface. Also, the interface of the asynchronous element is simplified. It is a further advantage of the present invention to increase the speed of the data transfer by reducing the number of steps which require synchronization, thereby reducing the number and duration of synchronization delays.

BRIEF DESCRIPTION OF THE DRAWINGS

The above noted and other aspects of the present invention will become more apparent from a description of the preferred embodiment when read in conjunction with the accompanying diagrams.

DESCRIPTION OF A PREFERRED EMBODIMENT

Figure 1:
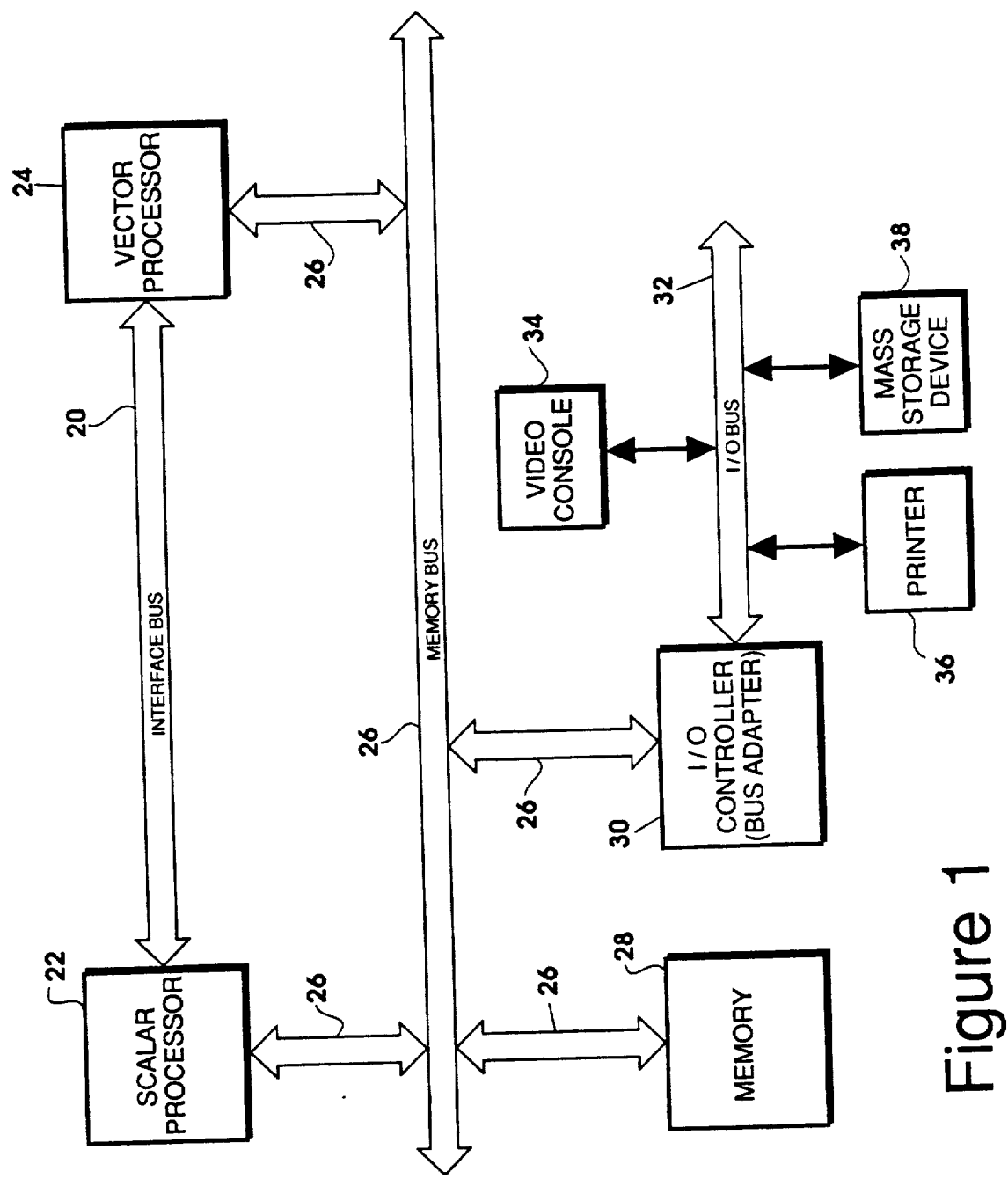
FIG. 1 is a general block diagram of a multiprocessor computer system with an interface bus.

Referring to FIG. 1, a general block diagram of a multi-processor computer system is shown. The system includes a primary (scalar) processor 22, a coprocessor (vector processor) 24, and an interface bus 20. Both processors are able to access main memory 28 via the system memory bus 26. In a preferred embodiment, the primary processor 22 is a scalar processor and the co-processor is a vector processor. Also in a preferred embodiment, the computer system utilizes VAX system architecture, as presently sold by the assignee of the present invention. The computer system shown in FIG. 1 also includes means for communicating with peripheral devices via an I/0 controller 30, otherwise known as a bus adapter, and an I/0 bus 32. Thus, bidirectional communication is possible with devices such as a video console 34, printer 36, and a mass storage device 38 such as a hard disk.

Figure 2:
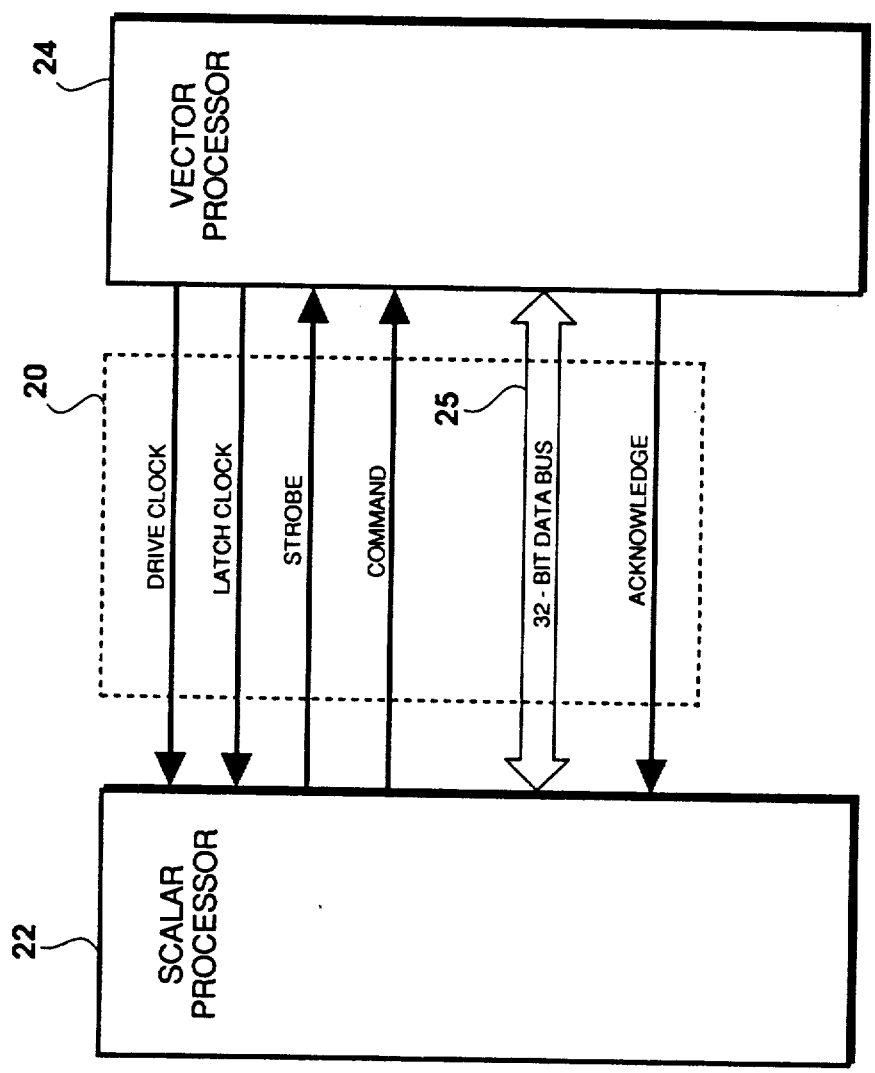
FIG. 2 illustrates the interface bus of FIG. 1.

Referring to FIG. 2, the interface bus 20 is shown in greater detail. The interface bus 20 comprises one-bit lines for the drive clock, the latch clock, the acknowledge signal and the strobe signal. The command line may be a multiple bit line for carrying read and write commands. The bus 20 also includes a 32-bit bidirectional data bus 25 which is used to transfer data between the processors. In a preferred embodiment, the information carried on the data bus 25 may include but is not limited to instructions. The validity of the data on the data bus 25 is indicated by the strobe signal on a write transaction and the acknowledge signal on a read transaction. In an embodiment herein disclosed, the vector processor provides clock signals for synchronizing data transfer on the bus but these clock signals could equivalently be provided by the scalar processor.

The vector processor 24 contains means for generating a drive clock signal, a latch clock signal, and an acknowledge signal in a manner known in the art. A bus cycle begins and ends on the rising edge of the drive clock pulse and is equivalent to two vector processor cycles or eight vector processor phases. The drive clock pulse lasts for one quarter of a bus cycle or two vector processor phases. The latch clock is used to latch signals on the bus. The latch clock pulse is initiated at the start of the second half of a bus cycle and also lasts for one quarter of a bus cycle or two vector processor phases. All bus signals to be described are asserted or deasserted by the scalar processor 22 or the vector processor 24 on the rising edge of a drive clock pulse and are received by the scalar processor 22 or the vector processor 24 on the falling edge of a latch clock pulse. The acknowledge signal indicates the completion of the vector processor's duties in a read or write transaction. In all cases, the acknowledge signal is deasserted in the bus cycle following the one in which it was asserted.

The scalar processor 22 is asynchronous to the clocks provided by the vector processor 24 and contains means for generating a strobe signal and a command signal in a manner known in the art. The strobe signal indicates the presence of valid data on the bus. The command signal indicates the type of transaction being performed on the bus 20 and is valid for all cycles during which the strobe signal is asserted.

Figure 3:
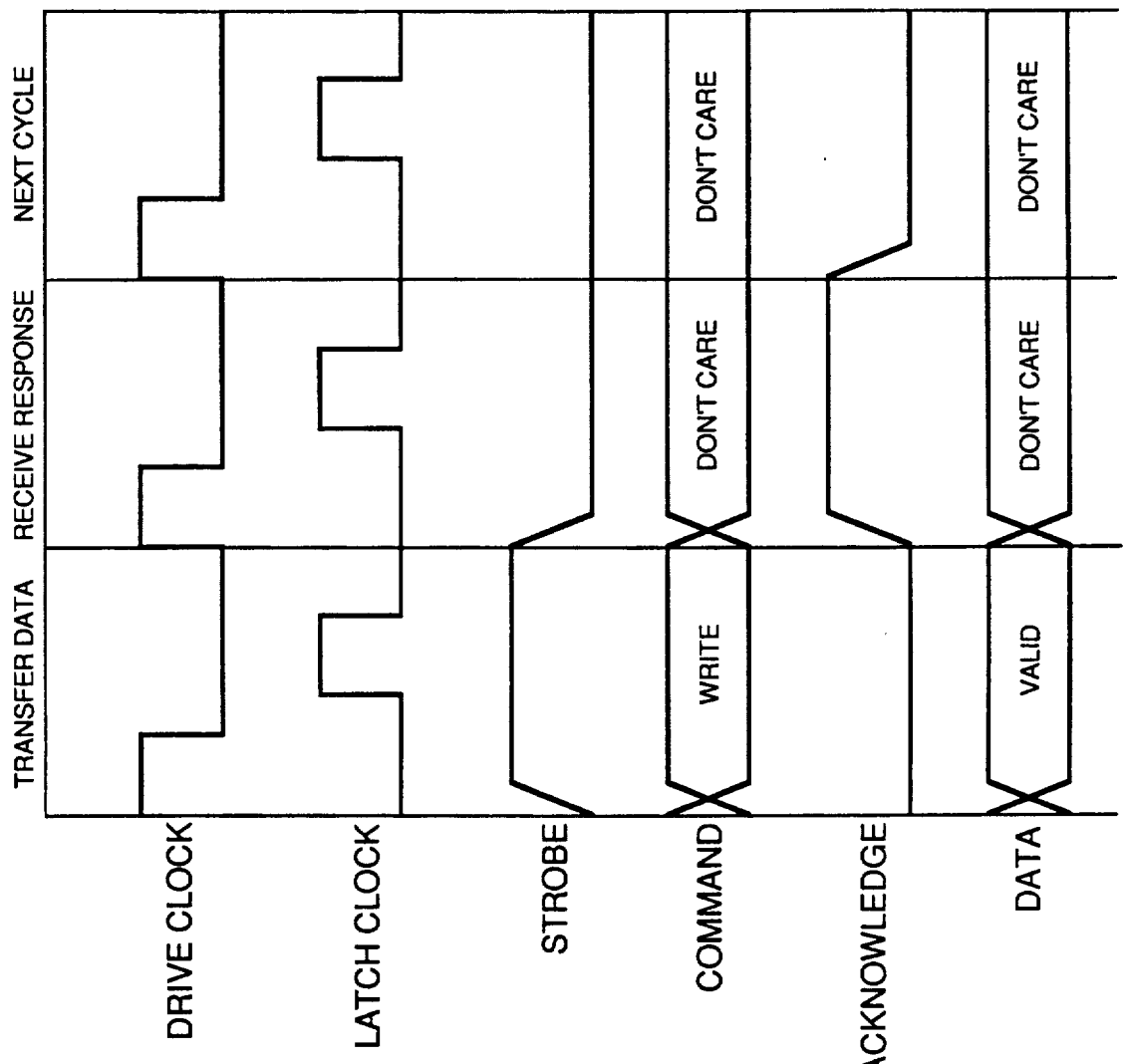
FIG. 3 is a timing diagram illustrating the timing of a write transaction.

The timing diagram in FIG. 3 depicts the sequence involved in a write transaction, i.e., when the scalar processor 22 is sending data to the vector processor 24. Each write transaction is initiated when the scalar processor 22 simultaneously asserts the strobe signal, asserts the command signal, and places the data on the data bus 25, all on the rising edge of a drive clock pulse. When the vector processor 24 receives the signals and data, it responds by asserting the acknowledge signal in the following bus cycle. The strobe signal does not remain asserted while waiting for the acknowledge assertion. Thus, the strobe signal and the command signal are deasserted on the same rising edge of the drive clock in the second bus cycle. Finally, the deassertion of the acknowledge signal on the next rising edge of the drive clock indicates that the vector processor 24 has received the data and is ready for the next transaction.

Figure 4:
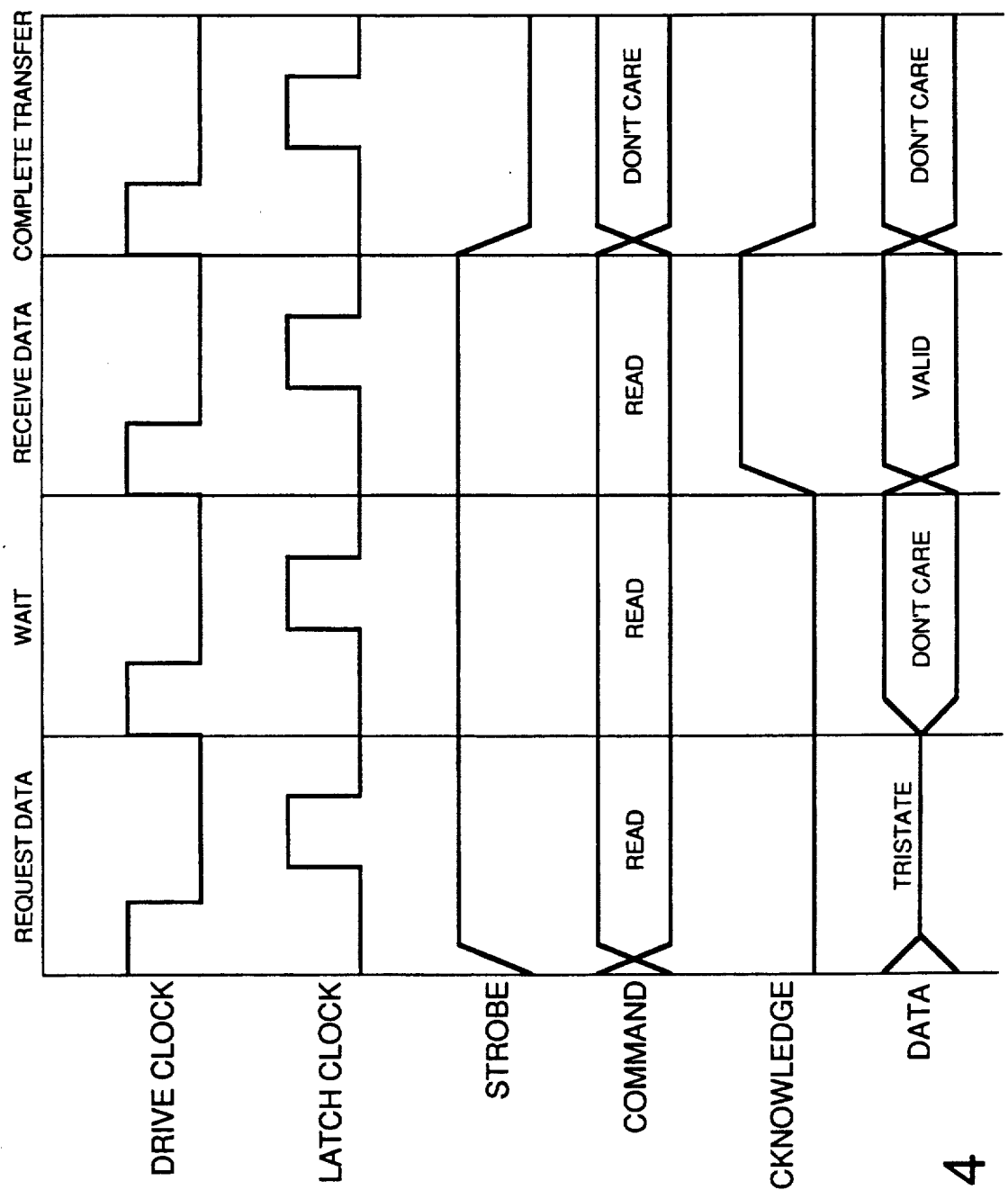
FIG. 4 is a timing diagram illustrating the timing of a read transaction.

The timing diagram in FIG. 4 depicts the sequence involved in a read transaction, i.e., when the scalar processor 22 requests data from the vector processor 24. The scalar processor 22 initiates the process by simultaneously asserting the strobe signal, asserting the read command signal, and tristating the data lines 25. All of this is done on the rising edge of a drive clock pulse.

After a number of cycles during which the strobe signal and the command signal are asserted (which may be due to the vector processor completing processing the requested data), the vector processor 24 places the requested data on the data bus 25 and asserts the acknowledge signal to indicate the validity of the data. The data and acknowledge signal are received by the scalar processor of the falling edge of the latch clock. The scalar processor 22 is always ready to receive the requested data, so no response is required. The vector processor 24 deasserts the acknowledge signal and stops supplying data in the next bus cycle.

The vector processor 24 does not respond to another bus command until the scalar processor 22 has deasserted the strobe signal for at least one bus cycle. On the falling edge of the next latch clock, the scalar processor recognizes the assertion of the acknowledge signal and deasserts the strobe signal during the next drive clock to terminate the read transaction.

Figure 5:
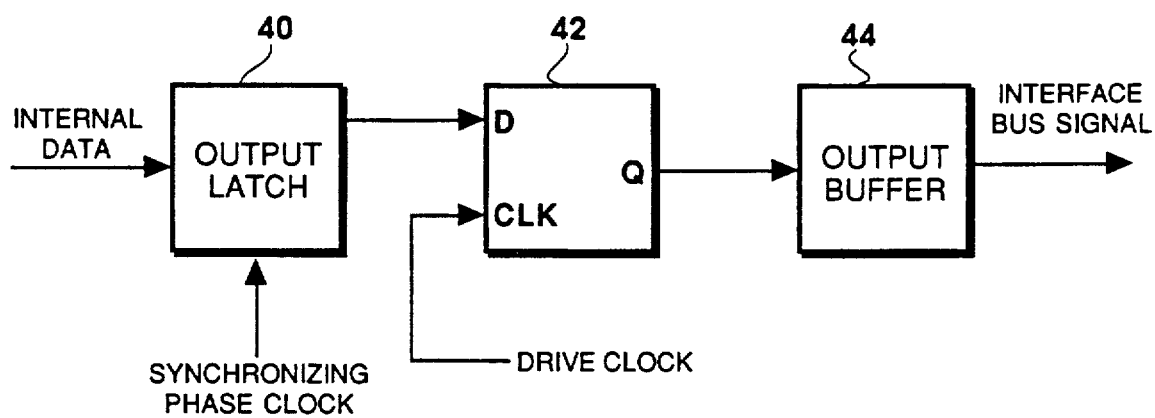
FIG. 5 is a block diagram of a drive synchronization logic circuit.

Referring now to FIG. 5, a block diagram of a drive synchronization logic circuit is shown. This circuit is used by the scalar processor 22 to synchronize outgoing signals to the bus. It comprises an output latch 40 clocked with a synchronizing phase clock, feeding into a D-type flip-flop 42 clocked on the rising edge of a drive clock pulse. The output of the D-type flip-flop 42 feeds into an output buffer 44 which drives the data onto the data bus 25. As used herein, the term phase clocks refers to clock pulses occurring at the four internal phases of a processor.

Figure 6A:
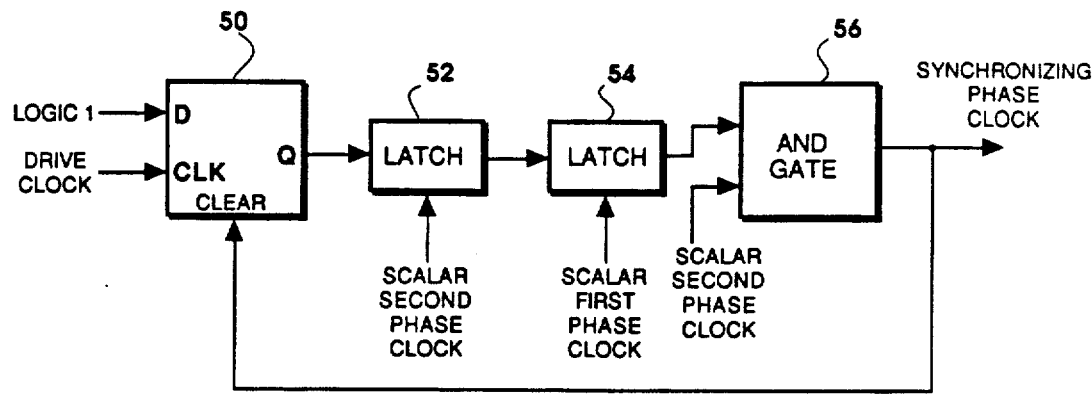
FIGS. 6(a-c) is a block diagram of a circuit used to generate the synchronizing phase clock of FIG. 5.
Figure 6B:
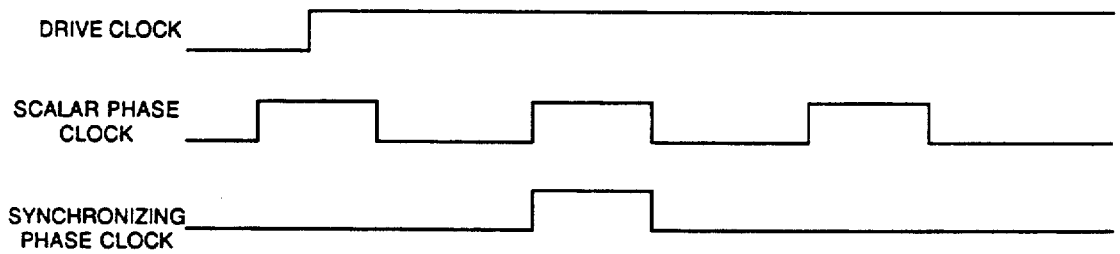
Figure 6C:
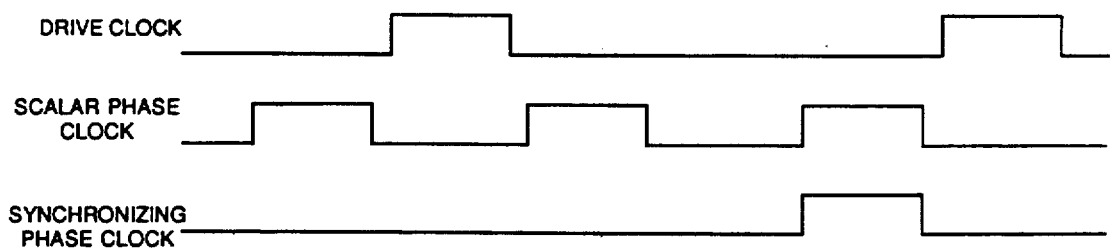

Referring now to FIGS. 6(a-c), a block diagram of a circuit used to generate the synchronizing phase clock is shown. This circuit operates in the following manner. A rising edge of a drive clock pulse sets a positive edge triggered D-type flip-flop 50. The output of the flip-flop 50 is then sampled in the next scalar second phase clock pulse by a latch 52. This latch, which is used as a synchronizer, is given three scalar processor phases to settle. Its output is then latched by a second latch 54 on the falling edge of a scalar first phase clock pulse. The synchronizer is necessary because the drive clock is asynchronous to the scalar processor phases.

The output of the second latch 54 is fed into an AND gate 56 in conjunction with the scalar second phase clock to generate the synchronizing phase clock. This loads the output latch 40 and drives the asynchronous clear input of flip-flop 50.

There are three restrictions on the clocking of the output latches under this scheme:

1) The output latch 40 must be loaded once and only once for every load of the drive clock, i.e., there must be only one assertion of a synchronizing phase clock pulse for each rising edge of the drive clock.

2) The output latch 40 must be loaded long enough before the rising edge of the drive clock to provide set-up time on the flip-flop 42.

3) The buffer in the scalar processor 22 which feeds the output latch 40 takes two scalar processor cycles to recognize the synchronizing phase clock pulse and present new data at the input of the output latch 40. Since the output latch 40 is clocked by the synchronizing phase clock pulse, there must not be synchronizing phase clock pulses in two consecutive scalar processor cycles.

To determine the allowable relative internal clock frequencies of the scalar and vector processors, these restrictions must be applied to the two worst-case situations. That is, when the vector processor 24 is much slower than the scalar processor 22 and when the two processors are running at approximately the same speed.

In the case where the vector processor 24 is much slower than the scalar processor 22, the rising edge of a drive clock pulse is caught by the synchronizing latch 52 on a first scalar second phase clock pulse and the synchronizing phase clock pulse is generated on the next second phase clock pulse. The synchronizing phase clock pulse clears the flip-flop 50. Because the flip-flop 50 is positive edge triggered, it will remain cleared until the rising edge of the next drive clock pulse. The fact that the drive clock in this case is still high when the clear occurs does not matter. Thus, there cannot be more than one synchronizing phase clock pulse for each rising edge of a drive clock pulse.

This same synchronizing phase clock pulse also loads the output latch 40, resulting in new data at the input of the flip-flop 42. Since this flip-flop is positive edge triggered, it will not place new data on the data bus 25 until the drive clock falls and rises again.

Because the vector processor 24 is running slowly compared to the scalar processor 22, the synchronizing phase clock pulse will occur long before the next rising edge of a drive clock pulse, so there will be enough set-up time for the flip-flop 42.

Thus, the drive synchronization logic circuit of FIG. 5 places no restrictions on how slowly the vector processor 24 may operate relative to the scalar processor 22.

The other worst-case relationship occurs when the two processors run at approximately the same speed. In this case, a scalar second phase clock pulse falls just before the rising edge of a drive clock pulse sets the flip-flop 50. The rising edge will not be detected by the synchronizing latch 52 until the scalar second clock phase pulse in the next scalar cycle, and the synchronizing phase clock pulse will not occur until the scalar cycle after that. Since the scalar processor cycle and the vector processor cycle are approximately equal in duration, and a drive clock pulse occurs every other vector processor cycle, the occurrence of two scalar cycles implies that the next drive clock pulse is about to occur.

The synchronizing phase clock pulse must be deasserted before the rising edge of the next drive clock pulse to avoid the conflict of trying to set and clear the flip-flop 50 at the same time. Also, the output latch 40 must be loaded early enough to allow set-up time for the flip-flop 42. Since the synchronizing phase clock pulse loads the output latch 40, the rising edge of the synchronizing phase clock pulse must occur early enough in relation to the drive clock pulse to allow set-up time for the flip-flop 50.

This relationship provides one scalar processor phase for data to flow through the output latch 40 and set up at the input of the flip-flop 42. The system will operate properly if the scalar processor 22 can pass data through the latch 40 in the width of one synchronizing phase clock pulse, which is one scalar processor phase. Thus, given ideal clocks, the relative clocks of the vector processor 24 and scalar processor 22 can be no greater than 1:1, i.e. the vector processor 24 cannot run faster than the scalar processor 22.

In reality, the clocks are not ideal. Jitter and variations in oscillating frequencies can cause the drive clock to appear to the scalar processor 22 to be running faster than the scalar processor clocks. If a rising edge of a drive clock pulse appears to occur, due to the non-ideal clocks, less than two scalar processor cycles after the last pulse, the synchronizing latch 52 could identify the edge immediately and produce synchronizing phase clock pulses in consecutive scalar processor cycles, which violates the third restriction.

For this reason, the vector processor internal clock in a preferred embodiment is selected to be at least five nanoseconds slower than the scalar processor internal clock to allow a margin of error for clock jitter and perceived variations.

Figure 7:
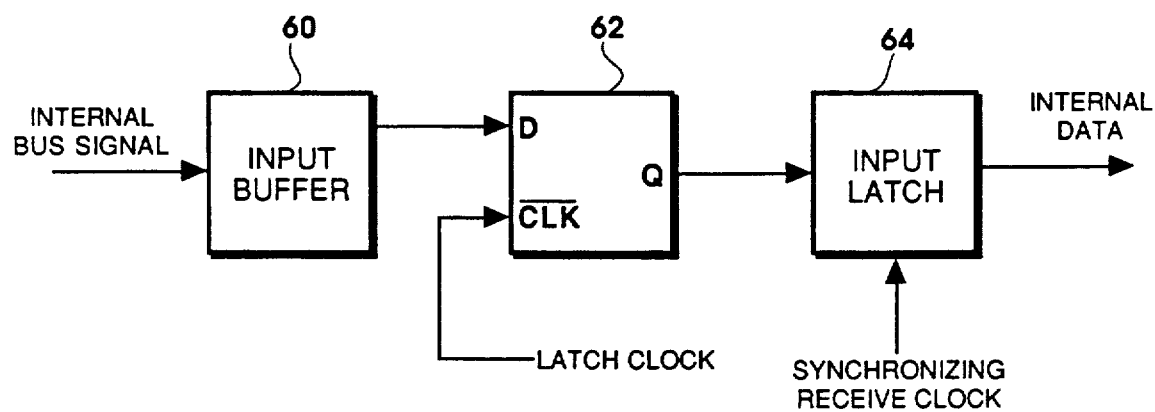
FIG. 7 is a block diagram of a receive synchronization logic circuit.

Referring now to FIG. 7, a block diagram of a receive synchronization logic circuit is shown. This circuit includes an input buffer 60 which receives incoming data or an acknowledge signal and a negative edge triggered D-type flip-flop 62 feeding an input latch 64 which is loaded by a synchronizing receive clock.

Figure 8A:
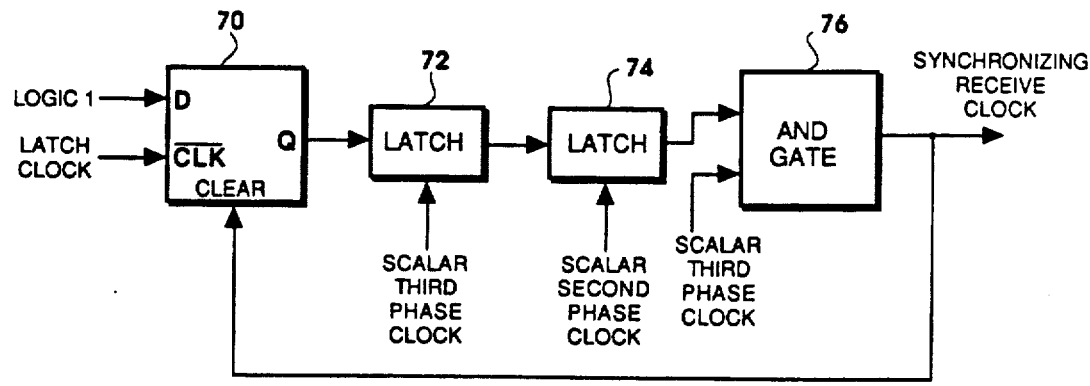
FIGS. 8 (a-c) is a block diagram of a circuit used to generate the synchronizing receive clock of FIG. 7.
Figure 8B:
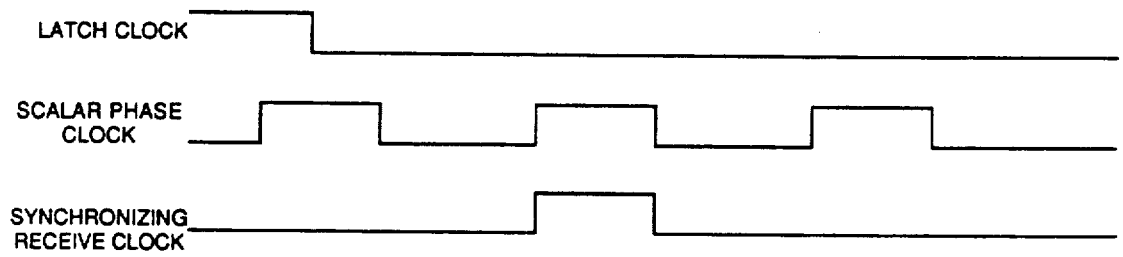
Figure 8C:
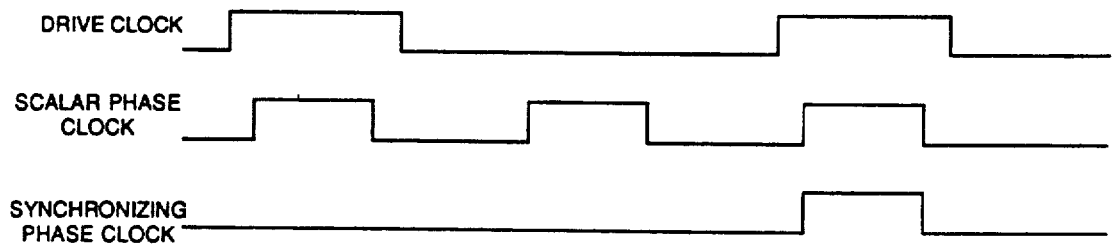

Referring now to FIGS. 8 (a-c), a block diagram of a circuit used to generate the synchronizing receive clock is shown. In this circuit, the falling edge of a latch clock pulse sets a negative edge triggered D-type flip-flop 70, the output of which is synchronized by latches 72 and 74. The synchronized output is fed into an AND gate 76 in conjunction with the scalar third phase clock to produce the synchronizing receive clock.

For the circuit to operate properly, two restrictions must be met:

1) The input latch 64 must be loaded once and only once for every load of the flip-flop 62, i.e., there must be only one synchronizing receive pulse for each falling edge of a latch clock pulse.

2) The input latch 64 must close before the falling edge of the next latch clock pulse to provide adequate hold time so as to not corrupt the input data.

There are two worst-case conditions to which these restrictions apply. They are the cases when the vector processor 24 is much slower than the scalar processor 22 and when the vector processor 24 and the scalar processor 22 run at approximately the same speed.

For the case when the vector processor 24 operates much slower than the scalar processor 22, the falling edge of a latch clock pulse is received by the synchronizing latches 72 and 74 on a scalar third phase clock pulse and a synchronizing receive clock pulse is generated on the next scalar third phase clock pulse. The synchronizing receive clock pulse clears the flip-flop 70.

Since the flip-flop 70 is negative edge triggered, it will remain cleared until the latch clock rises and then falls again. The fact that the latch clock in this case is still low when the clear occurs does not matter. Thus, there cannot be more than one synchronizing receive clock pulse for each falling edge of a latch clock pulse.

The synchronizing receive clock pulse also loads the input latch 64, thereby transferring new data to the scalar processor 22. Since the vector processor 24 is running slowly compared to the scalar processor 22, the synchronizing receive clock pulse will fall long before the falling edge of the next latch clock pulse, so the hold time restriction for the input latch 64 is met. Thus, the receive circuit of FIG. 7 places no restrictions on how slowly the vector processor 24 may run relative to the scalar processor 22.

The other worst case relationship occurs when the vector processor 24 and the scalar processor 22 run at approximately the same speed. In this case, a scalar third phase clock pulse falls just before a falling edge of a latch clock pulse sets the flip-flop 70. The falling edge will not be detected by the synchronizing latches 72 and 74 until the scalar third phase clock pulse in the next scalar cycle, and the synchronizing receive clock pulse will not occur until the scalar cycle after that. Since the processor cycles are approximately equal in duration, the occurrence of two scalar cycles implies that the next latch clock pulse is about to expire.

The synchronizing receive clock pulse must be deasserted before the falling edge of the next latch clock pulse to avoid the conflict of trying to set and clear the flip-flop 70 at the same time. Also, the input latch 64 must be closed before the falling edge of the next latch clock pulse to prevent new data from flowing through the flip-flop 62 and corrupting the previous data. Thus, the synchronizing receive clock pulse must be deasserted before the falling edge of the next latch clock pulse.

As before, this relationship will allow the system to operate properly if the clocks are ideal and if the relative operating speeds of the vector processor 24 and the scalar processor is no more the 1:1. Since the clocks are not ideal, in a preferred embodiment the vector processor 24 is selected to operate at least five nanoseconds slower than the scalar processor 22.

Although the invention has been described in its present stage with a certain degree of particularity, it is understood that the present disclosure has been made only by way of example. Numerous modifications may be made without departing from the scope and spirit of the invention.

What is claimed is:

1. A method of transferring data over an interface bus from a first processor to a second processor comprising the steps of:
   a. simultaneously asserting a write command signal and a data signal on the interface bus by the first processor and, while the write command signal and the data signal are being asserted by the first processor, clocking a first drive clock pulse on the interface bus by the second processor;
   b. thereafter clocking a first latch clock pulse on the interface bus by the second processor while the write command signal and the data signal are being asserted, the first latch clock pulse having a rising edge and a falling edge, and, on the falling edge of said first latch clock pulse, latching the write command and data signals that are on the interface bus by the second processor;
   c. thereafter clocking a second drive clock pulse on the interface bus in response to which an acknowledge signal is asserted on the interface bus by the second processor in response to latching the write command data signals by the second processor;
   d. thereafter clocking a second latch clock pulse on the interface bus by the second processor while the acknowledge signal is asserted, the second latch clock pulse having a rising edge and a falling edge, and, on the falling edge of said second latch clock pulse, latching the acknowledge signal that is on the interface bus by the first processor; and
   e. thereafter, asserting a third drive clock pulse on the interface bus, in response to which the acknowledge signal is deasserted.

2. A method according to claim 1 wherein a strobe signal is asserted on the interface bus simultaneously with the write command signal and the data signal during the first drive clock pulse to indicate the presence of valid data and write command signals on the interface bus.

3. A method according to claim 1 wherein the first processor is a primary processor and the second processor is a co-processor.

4. A method according to claim 3 wherein the primary processor is a scalar processor and the co-processor is a vector processor.

5. A method for transferring data over an interface bus to a first processor from a second processor, comprising the steps of:
   a. clocking a first drive clock pulse on the interface bus by the second processor in response to which a read command signal is asserted on the interface busy by the first processor;
   b. thereafter, clocking a first latch clock pulse on the interface busy by the second processor, the first latch clock pulse having a rising edge and a falling edge, and on the falling edge of said first latch clock pulse, latching the read command signal that is on the interface bus by the second processor;
   c. thereafter, clocking a second drive clock pulse on the interface bus by the second processor in response which a data signal and an acknowledge signal are asserted on the interface bus by the second processor in response to latching the read command signal by the second processor;
   d. thereafter, clocking a second latch clock pulse on the interface bus by the second processor, the second latch clock pulse having a rising edge and a falling edge, and on the falling edge of said second latch clock pulse, latching the data signal and the acknowledge signal that are on the interface bus by the first processor;
   e. thereafter, clocking a third drive clock pulse on the interface bus by the second processor in response to which the acknowledge signal is deasserted by the second processor.

6. A method according to claim 5 wherein a strobe signal is asserted on the interface bus by the first processor simultaneously with the read command signal during the first drive clock pulse to indicate the presence of a valid command signal on the interface bus.

7. A method according to claim 6 wherein said strobe signal is deasserted during the third drive clock pulse.

8. A method according to claim 5 wherein the data lines are tristated on the interface bus during the first drive clock pulse by the first processor and tristated again on the interface bus during the third drive clock pulse by the second processor.

9. A method according to claim 5 wherein the first processor is a primary processor and the second processor is a co-processor.

10. A method according to claim 6 wherein the primary processor is a scalar processor and the co-processor is a vector processor.

11. A computer system comprising:
a. a first processor for transferring data;
b. a second processor for receiving and processing said data;
c. a data bus interconnecting the first processor and the second processor for transferring data between the first processor and the second processor;
d. said second processor including means for generating a drive clock signal;
e. said first processor including means for generating a synchronizing phase clock signal, said means comprising:
  i. means for generating first and second phase clocks;
  ii. a flip-flop for receiving said drive clock signal and for providing a first output signal in response thereto;
  iii. a first latch for receiving said first output signal and the second phase clock, said first latch generating a second output signal in response thereto;
  iv. a second latch for receiving said second output signal and the first phase clock, said second latch generating a third output signal in response thereto; and
  v. a two-input AND gate, the first input receiving the third output signal and the second input receiving the second phase clock, the output of the AND gate providing the synchronizing phase clock and a clear signal to the flip-flop;
f. said first processor further including data output means comprising:
  i. an output latch for receiving said synchronizing phase clock signal and for latching data received from the first processor in response to said synchronizing phase clock signal;
  ii. an output buffer functionally interconnected between said output latch and said data bus for transferring data received from said output latch onto said data bus; and
  iii. means interconnected between said output latch and said output buffer for receiving said drive clock signal and for transferring data from said output latch to said output buffer in response to said drive clock signal.

12. A computer system comprising:
a. a first processor for transferring data;
b. a second processor for receiving and processing said data;
c. a data bus interconnecting the first processor and the second processor for transferring data between the first processor and the second processor;
d. said first processor including means for generating a latch clock signal;
e. said second processor including means for generating a synchronizing receive clock signal, said means comprising:
  i. means for generating second and third phase clocks;
  ii. a flip-flop for receiving said latch clock signal and for providing a first output signal in response thereto;
  iii. a first latch for receiving said first output signal and the third phase clock, said first latch generating a second output signal in response thereto;
  iv. a second latch for receiving said second output signal and the second phase clock, said second latch generating a third output signal in response thereto; and
  v. a two-input AND gate, the first input receiving the third output signal and the second input receiving the third phase clock, the output of the AND gate providing the synchronizing receive clock and a clear signal to the flip-flop;
f. said second processor further including data input means comprising:
  i. an input buffer connected to the data bus for receiving data from the data bus;
  ii. an input latch functionally connected to said input buffer for receiving said synchronizing receive clock signal and for latching data received from said input buffer in response to said synchronizing receive clock signal; and
  iii. means interconnected between said input buffer and said input latch for receiving said latch clock signal and for transferring data from said input buffer to said input latch in response to said latch clock signal.

* * * * *